(12) United States Patent
Aksyuk et al.

(10) Patent No.: US 7,206,117 B2
(45) Date of Patent: Apr. 17, 2007

(54) SEGMENTED MEMS MIRROR FOR ADAPTIVE OPTICS OR MASKLESS LITHOGRAPHY

(75) Inventors: Vladimir A. Aksyuk, Piscataway, NJ (US); Cristian A. Bolle, Bridgewater, NJ (US); Maria E. Simon, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 100 days.

(21) Appl. No.: 11/009,447

(22) Filed: Dec. 10, 2004

(65) Prior Publication Data

US 2006/0126151 A1   Jun. 15, 2006

(51) Int. Cl.
  *G02B 26/00* (2006.01)
(52) U.S. Cl. ................................. 359/291; 359/290
(58) Field of Classification Search ........... 359/290, 359/291, 223, 224, 295
See application file for complete search history.

(56) References Cited

U.S. PATENT DOCUMENTS

| | | | |
|---|---|---|---|
| 5,691,541 A | 11/1997 | Ceglio et al. | 250/492.1 |
| 6,201,631 B1 | 3/2001 | Greywall | 359/245 |
| 6,384,952 B1* | 5/2002 | Clark et al. | 359/224 |
| 2002/0067533 A1* | 6/2002 | Sun et al. | 359/198 |

\* cited by examiner

*Primary Examiner*—Timothy Thompson
*Assistant Examiner*—Jerry Fang

(57) ABSTRACT

An apparatus having a plurality of arrayed MEMS devices, each device having a parallel-plate actuator and a reflective plate, both of which are mechanically coupled to a flexible beam attached between two anchors. Advantageously, the use of parallel-plate actuators in the apparatus alleviates stringent requirements for the alignment of lithographic masks employed in the fabrication process. In one embodiment, each flexible beam has a relatively small thickness and a relatively large length to effect a relatively large displacement range for the corresponding reflective plate. Movable electrodes of different parallel-plate actuators are configured to act as an electrical shield for the flexible beams, which reduces inter-device crosstalk in the apparatus. Reflective plates of different MEMS devices form a segmented mirror, which is suitable for adaptive-optics and/or maskless lithography applications.

15 Claims, 6 Drawing Sheets

SEGMENTED MEMS MIRROR FOR ADAPTIVE OPTICS OR MASKLESS LITHOGRAPHY

BACKGROUND OF THE INVENTION

1. Field of the Invention

The present invention relates to adaptive optics and spatial light modulators for optical maskless lithography (OML) and, more specifically, to micro-electromechanical systems (MEMS) for implementing adaptive optics and/or spatial light modulators.

2. Description of the Related Art

Adaptive optics is a field of optics dedicated to the improvement of optical signals using information about signal distortions introduced by the environment in which the optical signals propagate. An excellent introductory text on the subject is given in "Principles of Adaptive Optics" by R. K. Tyson, Academic Press, San Diego, 1991, the teachings of which are incorporated herein by reference.

A representative example of an adaptive optical element is a deformable mirror driven by a wavefront sensor and configured to compensate for atmospheric distortions that affect telescope images. Small naturally occurring variations in temperature (~1° C.) in the atmosphere cause random turbulent motion of the air and give rise to changes in the atmospheric density and, hence, to changes in the index of refraction. The cumulative effect of these changes along the beam propagation path may lead to (a) beam wandering, (b) beam spreading, and (c) beam intensity fluctuations, each of which degrades image quality. The wavefront sensor is a device that measures the distortions introduced in the atmosphere and generates feedback for the deformable mirror. Based on the feedback, the mirror is deformed such that the beam distortions are significantly reduced, thus improving the image quality.

Optical maskless lithography (OML) is an emerging new technology intended as a replacement for conventional mask-based lithography, e.g., in low-volume production of integrated circuits. A detailed description of a representative OML system can be found, for example, in U.S. Pat. No. 5,691,541, the teachings of which are incorporated herein by reference. Briefly, instead of a permanent glass mask employed in conventional mask-based lithography, OML uses a configurable deformable mirror to project and imprint a desired image onto the substrate. Since the deformable mirror can relatively easily be reconfigured to project and imprint a new image, the cost of low-volume device production, which is largely determined by the cost of production, inspection, repair, and protection of lithographic masks, can significantly be reduced.

U.S. Pat. No. 6,384,952, the teachings of which are incorporated herein by reference, discloses a representative prior-art device having a deformable membrane mirror, which can be used in certain adaptive optics and/or OML applications. To enable the membrane deformations, the device has a plurality of actuators connected to the membrane. Each actuator has two interleaved comb-shaped portions connected between the membrane and a substrate and offset with respect to each other in the direction perpendicular to the substrate. During the device fabrication process, the offset comb-shaped portions are typically formed in different layers of a layered wafer, which may result in certain wafer processing problems. For example, it may be relatively difficult to achieve proper alignment of the interleaved structures of the comb-shaped portions with respect to each other because different layers are processed during different fabrication steps using different lithographic masks.

SUMMARY OF THE INVENTION

Problems in the prior art are addressed, in accordance with the principles of the present invention, by an apparatus having a plurality of arrayed MEMS devices, each device having a parallel-plate actuator and a reflective plate, both of which are mechanically coupled to a flexible beam attached between two anchors. Advantageously, the use of parallel-plate actuators in the apparatus alleviates stringent requirements for the alignment of lithographic masks employed in the fabrication process. In one embodiment, each flexible beam has a relatively small thickness and a relatively large length to effect a relatively large displacement range for the corresponding reflective plate. Movable electrodes of different parallel-plate actuators are configured to act as an electrical shield for the flexible beams, which reduces inter-device crosstalk in the apparatus. Reflective plates of different MEMS devices form a segmented mirror, which is suitable for adaptive-optics and/or OML applications.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
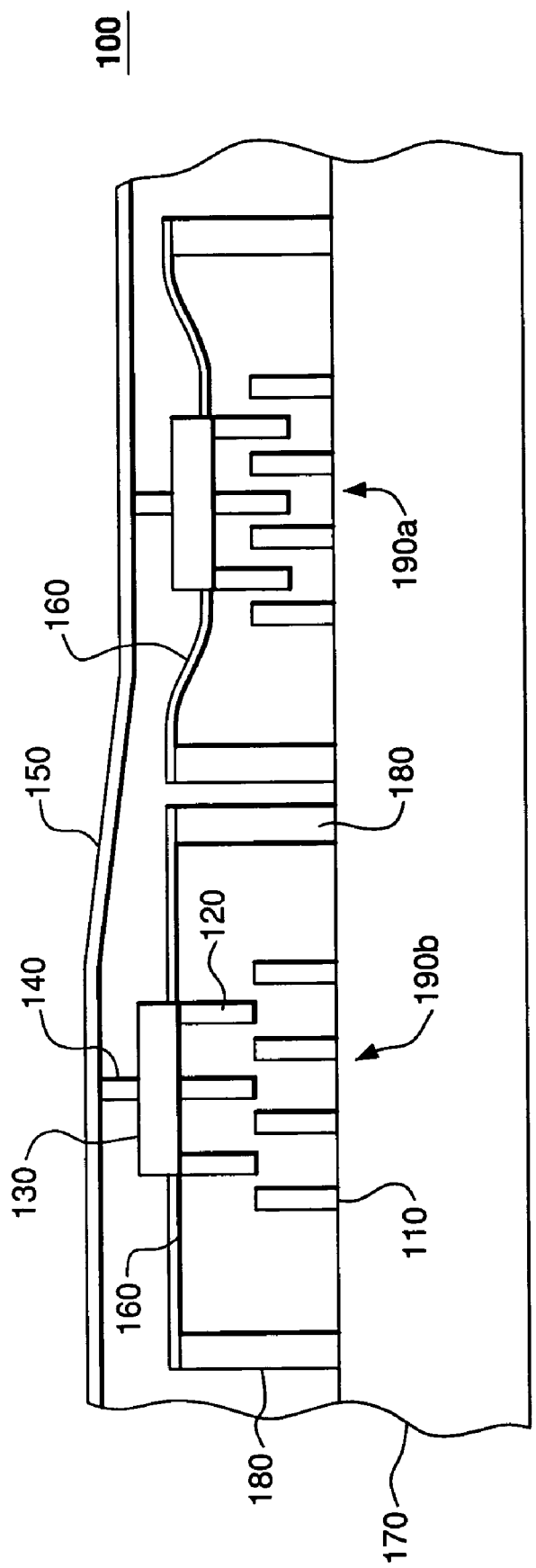
FIG. 1 shows a side view of a representative prior-art device having a deformable membrane.

FIG. 1 shows a side view of a representative prior-art device 100 disclosed in U.S. Pat. No. 6,384,952. Device 100 has a deformable membrane 150 connected to a plurality of actuators 190 supported on a substrate 170. Only two actuators 190a–b of the plurality are shown in FIG. 1. Each actuator 190 has (i) a stator 110 attached to substrate 170 and (ii) a slider 120 supported on the substrate by two anchors 180 and a spring 160. To transfer motion of slider 120 to membrane 150, device 100 has a pole 140 attached between the membrane and a slider bar 130. When a voltage differential is applied between stator 110 and slider 120 of actuator 190, the slider pulls membrane 150 toward substrate 170, e.g., as shown in actuator 190a. When the voltage differential is removed, the spring force of spring 160 returns slider 120 into the initial position, e.g., as shown in actuator 190b. When different actuators 190 are appropriately biased to produce different displacements, membrane 150 is deformed into a desirable shape, e.g., corresponding to wavefront distortions.

One problem with device 100 is related to its fabrication. More specifically, since stator 110 and slider 120 of actuator 190 are (vertically) offset with respect to each other, they are formed in different layers of a layered wafer typically used in the device fabrication process. Because different layers are processed during different fabrication steps using different lithographic masks, it is relatively difficult to achieve proper alignment of the interleaved comb structures of stator 110 and slider 120 with respect to each other when the actuator size is relatively small, e.g., about 1 µm. This difficulty arises primarily from the underlying requirement to overlay the lithographic masks with sub-micron precision.

Figure 2:
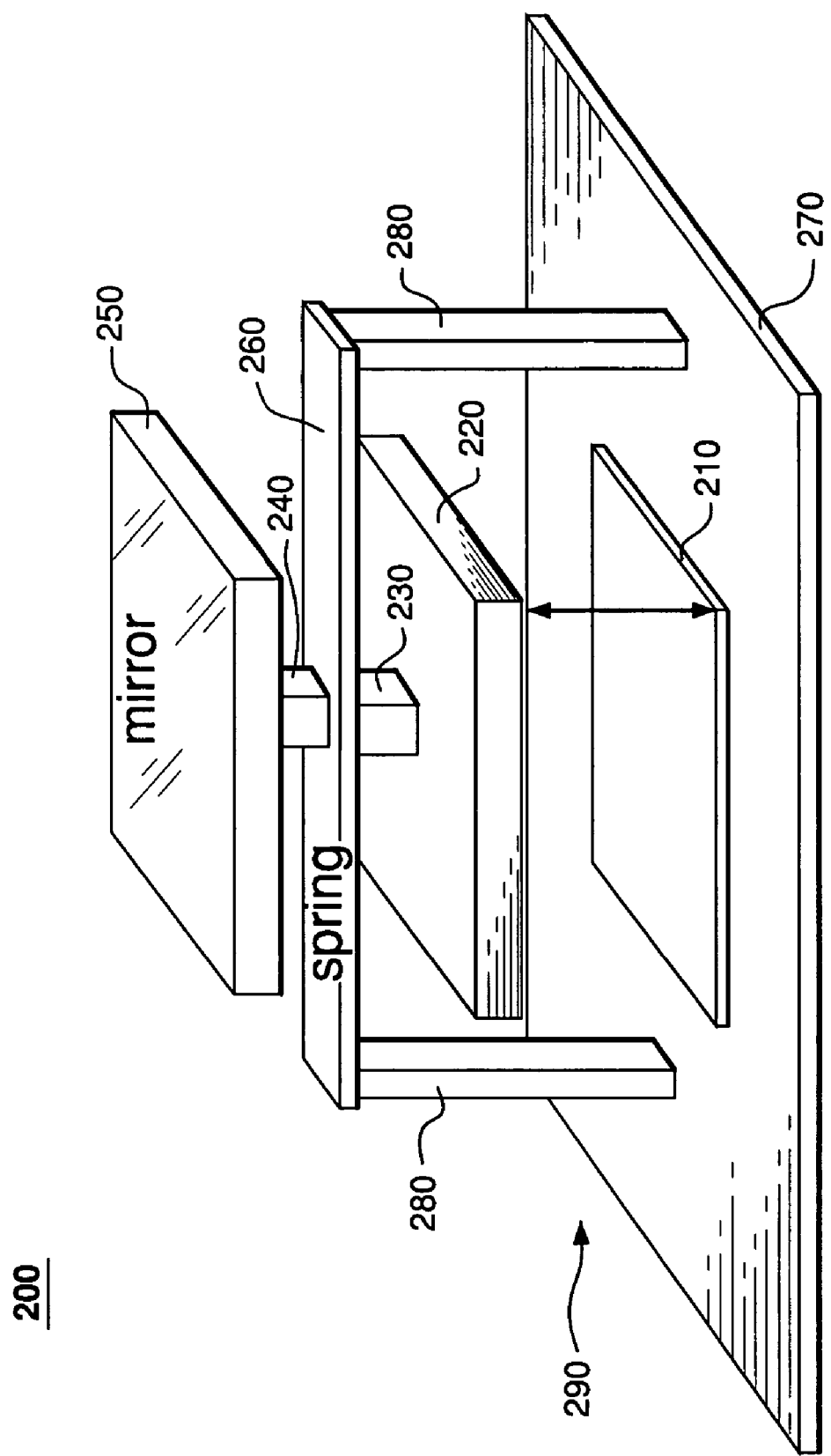
FIG. 2 shows a three-dimensional perspective view of a MEMS device according to one embodiment of the invention.

FIG. 2 shows a three-dimensional perspective view of one embodiment of a MEMS device 200 arranged in accordance with the principles of the invention. Device 200 has a plate (e.g., mirror) 250 connected to an actuator 290 supported on a substrate 270. Actuator 290 has (i) a stationary electrode 210 attached to substrate 270 and (ii) a movable electrode 220 connected to a support pole 230, which is supported on the substrate by a spring (flexible beam) 260 attached between two anchors 280. Motion of movable electrode 220 is transferred to spring 260 via pole 230 and to mirror 250 via a pole 240 attached between the spring and the mirror. When a voltage differential is applied between stationary electrode 210 and movable electrode 220 of actuator 290, it generates an attractive electrostatic force between the electrodes causing the movable electrode to move toward the stationary electrode. Motion of movable electrode 220 (i) deforms spring 260, thereby generating a counteracting spring force, and (ii) is transferred to mirror 250 via poles 230 and 240. When the voltage differential is removed, the spring force of deformed spring 260 returns movable electrode 220 and mirror 250 into their initial positions.

At least two differences between device 200 of FIG. 2 and device 100 of FIG. 1 are apparent. First, instead of a deformable membrane in device 100, device 200 employs a rigid (mirror) plate. Second, instead of comb-shaped actuator 190 in device 100, device 200 employs parallel-plate actuator 290. The latter alleviates the above-indicated fabrication problems because, in the absence of sub-micron interleaved comb structures, the precision required in the alignment of lithographic masks becomes less stringent. Further advantages of device 200 come into play when multiple devices 200 are arrayed to form a segmented mirror. These advantages are described in more detail below.

Figure 3:
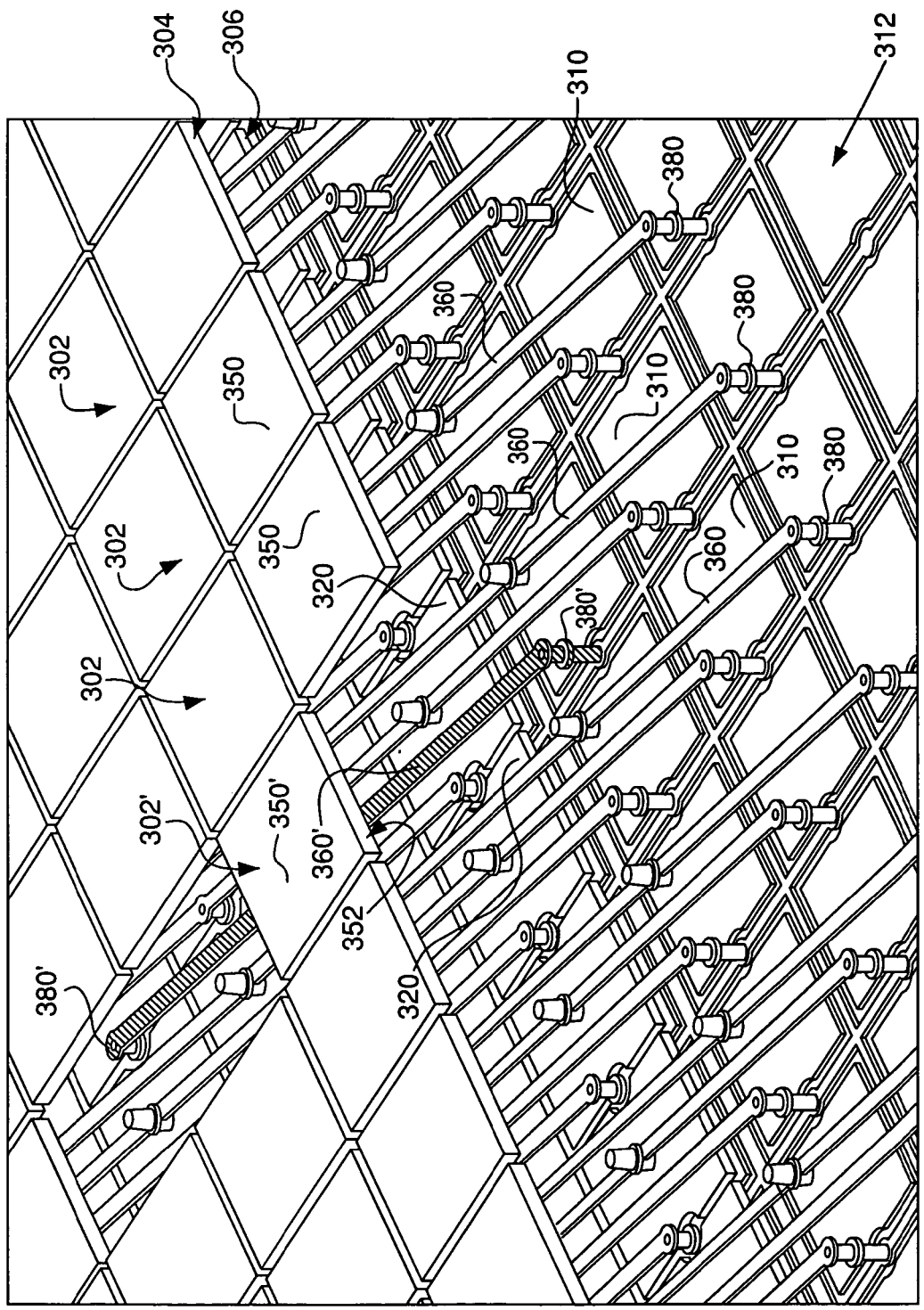
FIG. 3 shows a three-dimensional partial cutaway perspective view of an arrayed MEMS device according to one embodiment of the invention.

FIG. 3 shows a three-dimensional partial cutaway perspective view of an arrayed MEMS device 300 according to one embodiment of the invention. Device 300 has a plurality of devices 302, each of which is analogous to device 200 of FIG. 2. Accordingly, analogous structural elements in devices 302 and 200 are marked with labels having the same last two digits. Devices 302 are arrayed such that mirrors 350 of different devices 302 form a substantially contiguous segmented mirror 304. Each device 302 can be operated independently of any other device 302 in arrayed device 300. As a result, when actuators of different devices 302 are appropriately biased to produce the corresponding displacements, segmented mirror 304 adopts a desirable shape, e.g., corresponding to wavefront distortions.

To enable a relatively large displacement (e.g., about 0.1 µm) for mirror 350 in device 302 at a relatively low voltage differential (e.g., about 5 V) between electrodes 310 and 320, spring 360 is designed to be relatively compliant. To meet this design goal, each spring 360 in device 300 is implemented to have a relatively small thickness (e.g., less than about 0.1 µm) and a relatively large length (e.g., about 10 µm). As a result, the length of each spring 360 is greater than the lateral sizes of the corresponding mirror 350 and electrodes 310 and 320. For example, in the embodiment shown in FIG. 3, each spring 360 is about 4.1 times longer than a side of mirror 350. This relatively long span of springs 360 in device 300 poses two potential problems: (1) packing of the springs and mirrors belonging to different devices 302 while realizing substantial contiguity for segmented mirror 304 and (2) reducing, to an acceptable level, crosstalk caused by electrostatic interactions between electrode 310 of one device 302 and spring 360 spanning over that electrode and belonging to another device 302.

The first problem is addressed in device 300 by placing each anchor 380 at a border between neighboring electrodes 310 such that two anchors 380 corresponding to the same device 302 are located at an angle across a row formed by electrodes 310 belonging to different devices 302. For example, anchors 380' of device 302' are located at opposite edges of a row 312 of electrodes 310, which results in an angle of about 76 degrees between spring 360' supported by those anchors and a side 352 of mirror 350'. Other springs 360 in device 300 run substantially parallel to spring 360'.

The second problem is addressed in device 300 by configuring movable electrodes 320 to serve as an electrical shield for springs 360. More specifically, each electrode 320 (i) has a shape matching that of the underlying electrode 310 and (ii) is electrically connected to be at the same potential (e.g., ground) as springs 360. When stationary electrode 310 is biased with respect to movable electrode 320, the latter remains at the same potential as spring(s) 360 located over the movable electrode, thereby electrically shielding the spring(s) from the electric field generated by the biased stationary electrode. In a preferred embodiment, movable electrodes 320 of different devices 302 form, at a rest position, a substantially contiguous segmented plate 306, which, due to its contiguity, serves as a very effective electrical shield for the springs. Note that no comparable electrical shielding is available in prior-art device 100 (FIG. 1).

Briefly referring back to FIG. 2, it is known that that a double-clamped flexible beam similar to spring 260 having a length of 2L has a buckling instability when subjected to compressive stress, σ. This instability might significantly affect the mechanical response of the spring when the compressive stress approaches a value of $\sigma_0$ given by Eq. (1) as follows:

$$\sigma_0 = \frac{\pi^2 E t^2}{12 L^2} \qquad (1)$$

where E is the Young's modulus of the spring's material, and t is the thickness of the spring. Because device 200 is typically fabricated from a layered wafer, some residual stress is usually present in spring 260 after the spring has been formed and released from the corresponding layer of the layered wafer during the fabrication process. At a relatively small value of t/L, the residual stress for spring 260 might approach or even exceed $\sigma_0$, thereby adversely affecting the operation of device 200.

Figure 4:
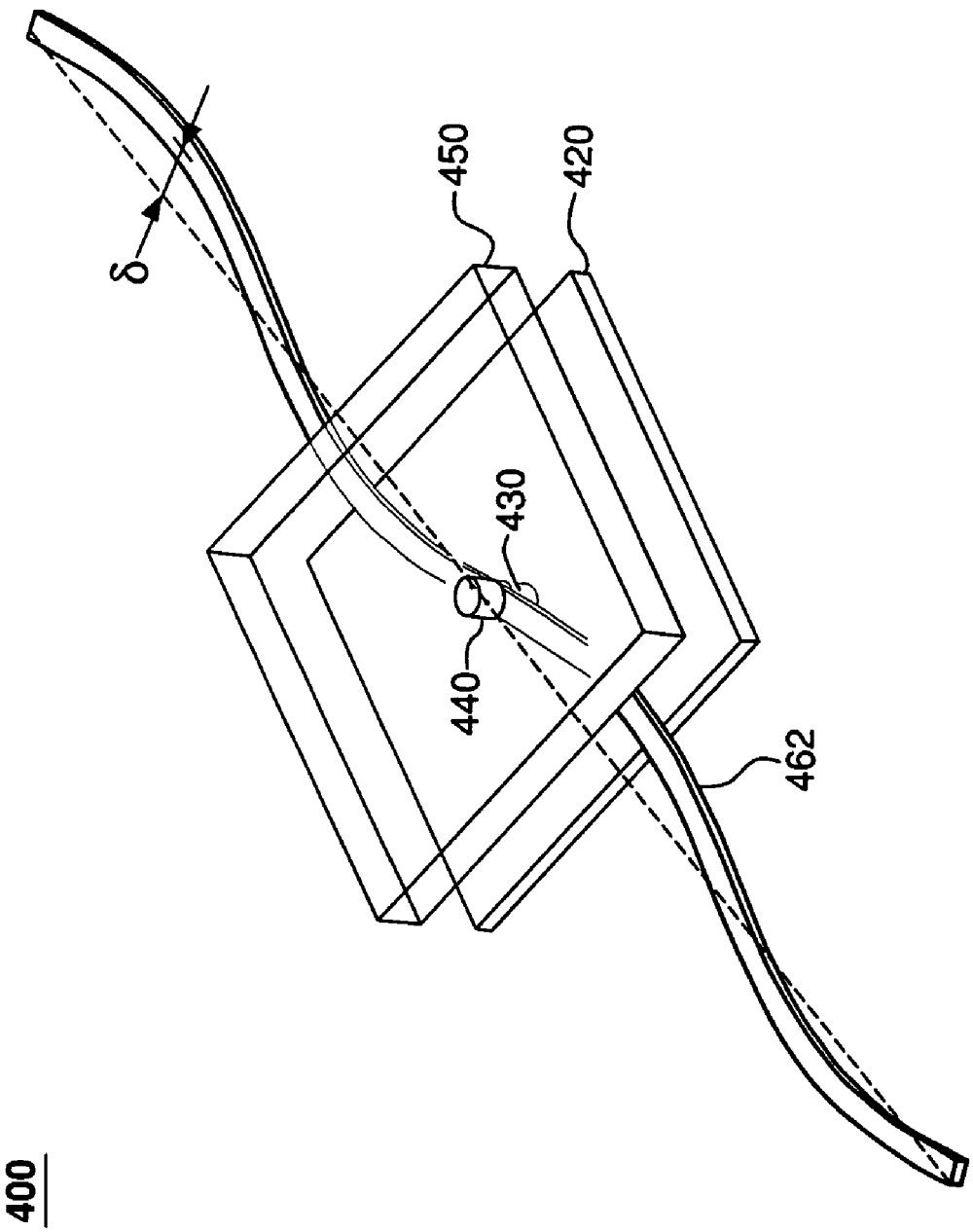
FIG. 4 shows a partial three-dimensional perspective view of a MEMS device according to another embodiment of the invention.

FIG. 4 shows a partial three-dimensional perspective view of a MEMS device 400 according to another embodiment of the invention. Device 400 is analogous to device 200 of FIG. 2, and analogous structural elements in those devices are marked with labels having the same last two digits. However, instead of straight-shaped spring 260 used in device 200, device 400 has a curved spring 462. As shown below, the buckling instability for spring 462 occurs at a higher stress than that for spring 260. As a result, the adverse effect of residual stresses on the mechanical response of the spring is less pronounced in device 400 than in device 200.

In the particular embodiment shown in FIG. 4, curved spring 462 has a flat sinusoidal shape with δ denoting a maximum deviation of the shape from the straight (dashed) line drawn through the centers of pole 440 and the anchors supporting the spring. The anchors, the stationary electrode, and the substrate of device 400 are not shown in FIG. 4 for clarity. One skilled in the art will appreciate that, in other embodiments, other shapes for curved spring 462 may similarly be used.

Figure 5:
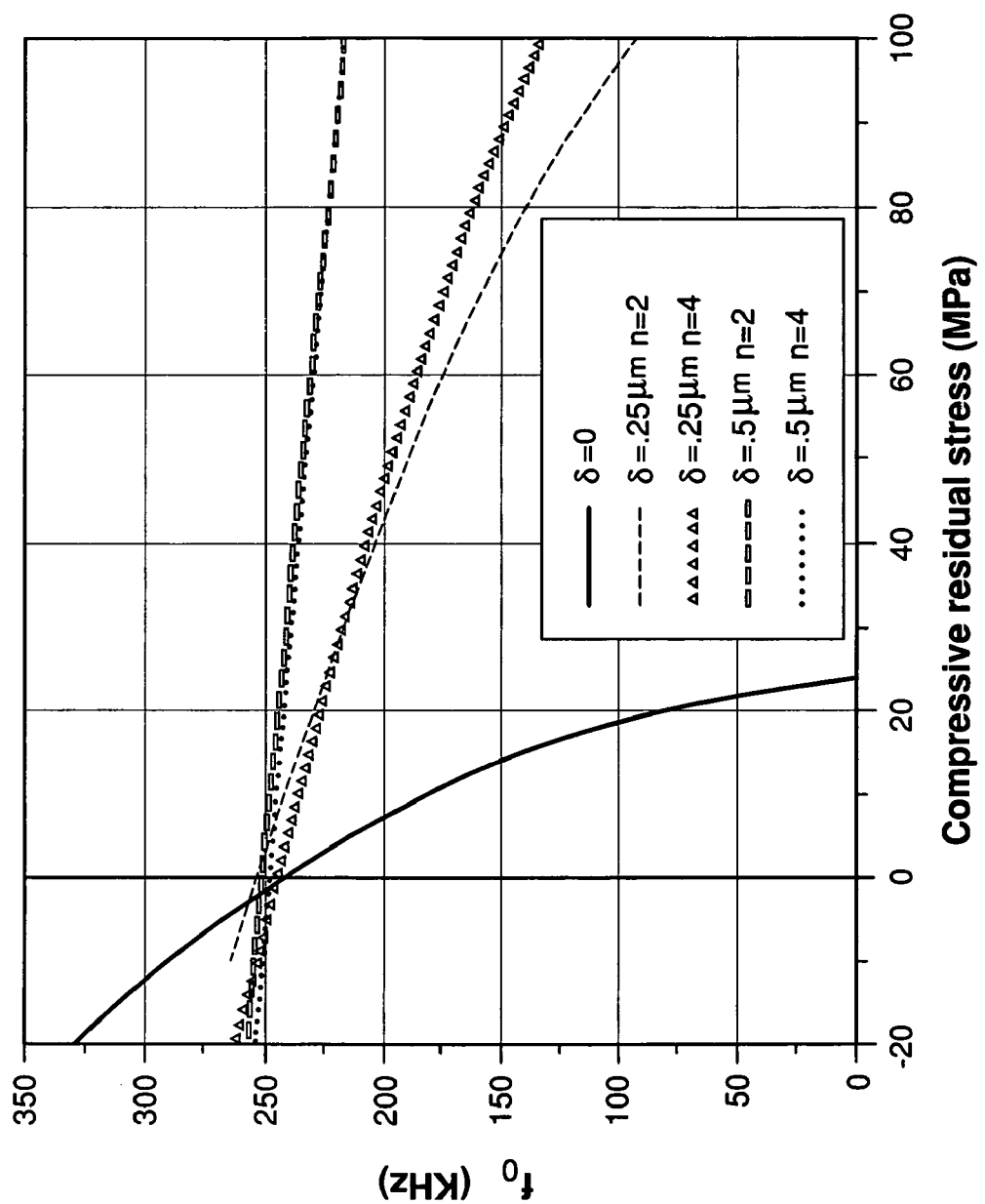
FIG. 5 graphically compares buckling instabilities of a spring utilized in the device of FIG. 2 and different implementations of a spring utilized in the device of FIG. 4.

FIG. 5 graphically compares buckling instabilities of spring 260 and different implementations of spring 462. More specifically, FIG. 5 shows the resonant frequency, $f_0$, of the piston mode for springs 260 and 462 (i.e., the mode causing a middle portion of the spring to translate substantially perpendicular to the plane of the substrate) as a function of compressive residual stress in the spring material, with the buckling instability corresponding to the zero resonant frequency. Each of the springs compared in FIG. 5 has a length of 10 μm, a width of 0.3 μm, and a thickness of 0.1 μm. Spring 260 corresponds to δ=0. Each of springs 462 (δ≠0) has a sinusoidal shape with the parameters indicated in the legend, where n denotes the number of periods of the sine wave between the anchors of the spring. As can be seen, the buckling instability for spring 262 occurs at about 23 MPa. In contrast, for each of springs 462, the buckling instability has advantageously shifted to a residual stress greater than 100 MPa.

It is also worth noting that the resonant frequency squared is approximately proportional to the elastic stiffness of the spring. Therefore, FIG. 5 can alternatively be viewed as an illustration of how residual stress affects the elastic stiffness. Changes in the elastic stiffness, in turn, affect the voltage differential, which needs to be applied to produce a given mirror displacement.

Figure 6:
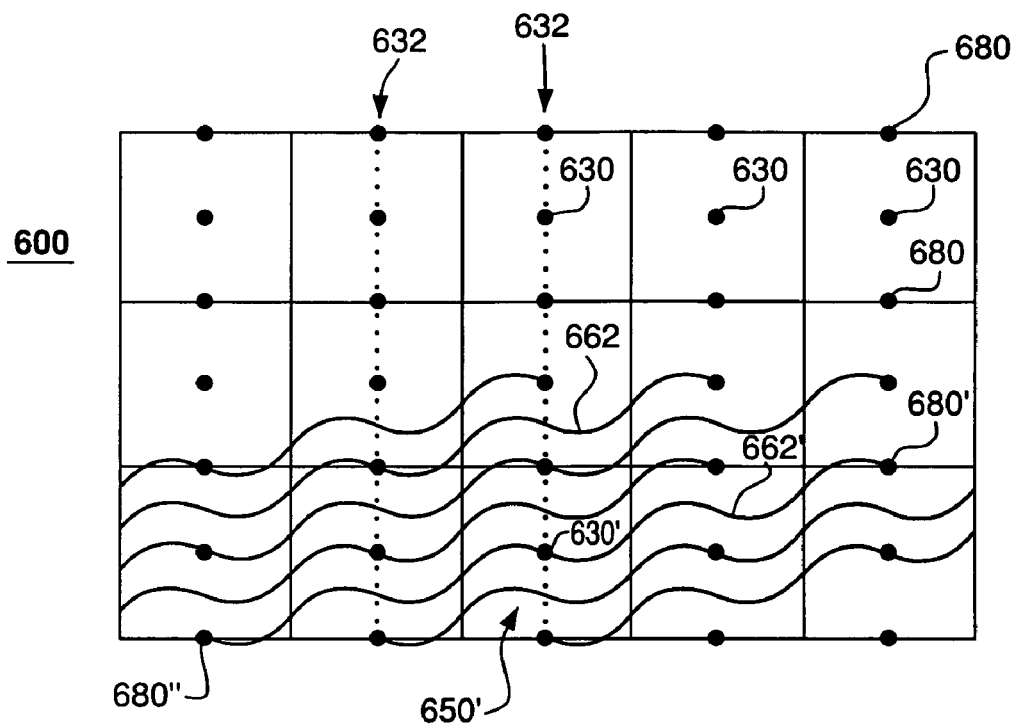
FIGS. 6–7 show layouts of arrayed MEMS devices according to certain embodiments of the invention.

FIG. 6 shows a layout of an arrayed MEMS device 600 according to one embodiment of the invention. Device 600 is similar to device 300 (FIG. 3) and has a plurality of devices (pixels), each of which is analogous to device 400 of FIG. 4. Each square in FIG. 6 represents the footprint (i.e., the outline of the projection onto the plane of the substrate) of a mirror 650 that is analogous to mirror 450, each dot in the center of a square represents a pole 630 that is analogous to pole 430, and each dot at a border between squares represents a spring anchor 680 that is analogous to spring anchor 280. Curved springs 662 of device 600 are represented in FIG. 6 by the wavy lines. For example, curved spring 662' corresponding to mirror 650' is attached between anchors 680' and 680'. Note that not all of the springs are shown, and that some of the springs are shown only partially.

Anchors 680 and poles 630 create a grid, which constraints the shapes that can be used for curved springs 662. More specifically, curved spring 662 corresponding to one pixel has to pass through one or more openings between an anchor 680 and a neighboring pole 630 corresponding to other pixels. In a preferred embodiment, within a plane 632 corresponding to a row of anchors 680 and poles 630, each spring 680 unattached to the anchors and poles in that row passes through a midpoint between the anchor and pole located next to the spring.

In one embodiment, the above-indicated constraints are met by springs 662, each of which has a shape described by a periodic function y=F(x), where: (i) x is the coordinate along the straight line connecting anchors 680 of the spring, with x=0 representing the point of attachment of pole 630 to the spring, and (ii) y is the deviation of the shape from that straight line. Function F(x) is an odd function of x having a period of Λ. As such, F(0)=0. The distance between the anchor points of each spring is 4Λ, with the anchor coordinates being $x_1=-2\Lambda$ and $x_2=+2\Lambda$, respectively. A representative example of function F(x) is given by Eq. (2) as follows:

$$F(x)=\delta \sin(2\pi x/\Lambda) \quad (2)$$

Figure 7:
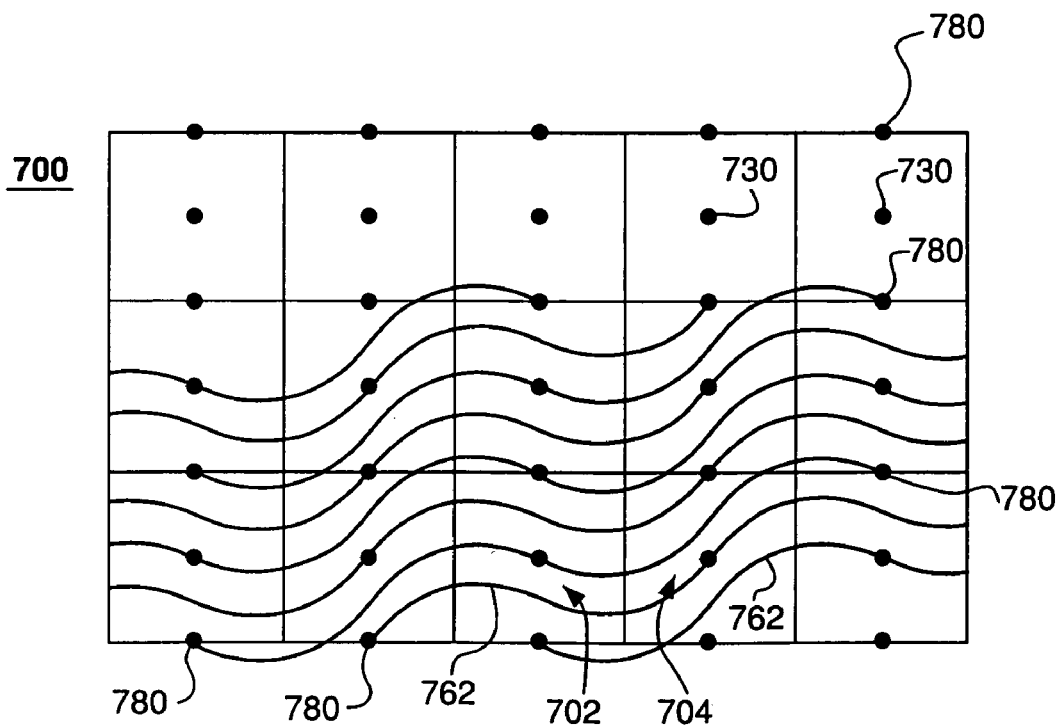

FIG. 7 shows a layout of an arrayed MEMS device 700 according to another embodiment of the invention. Device 700 has a plurality of pixels and is similar to device 600 of FIG. 6. However, in device 700, the distance between anchors 780 of each spring 762 is 2Λ, with the anchor coordinates being $x_1=-\Lambda$ and $x_2=+\Lambda$, respectively. One skilled in the art will appreciate that, in different embodiments, the spring anchors may be separated by other appropriate distances related to the period of function F(x), e.g., Λ, 3Λ, or jΛ, where j is an integer greater than 4.

Referring now to both FIGS. 6 and 7, one additional difference between arrayed MEMS devices 600 and 700 is in the structure of a unit cell, by the replication of which the arrayed device is produced. More specifically, device 600 is produced by the application of a translation operation, along two orthogonal directions, to a single pixel element. As such, a unit cell in device 600 has a single pixel. In contrast, device 700 is produced by the application of two types of operations: a mirror-image operation and a translation operation. For example, curved spring 762 in pixel 702 is a mirror image of curved spring 762 in pixel 704 with respect to the plane, which passes through the anchors of the spring and is orthogonal to the plane of the substrate, and vice versa. As such, a unit cell in device 700 has two pixels, e.g., pixels 702 and 704, and the device is produced by the application of a translation operation, along two orthogonal directions, to this double-pixel element. One skilled in the art will appreciate that, in different embodiments, the unit cell might have a different number of pixels, and different symmetry operations might be used to arrange the pixels in the array.

Devices of the present invention may be fabricated, as known in the art, using layered (e.g., silicon-on-insulator) wafers. Additional layers of material may be deposited onto a wafer using, e.g., chemical vapor deposition. Various parts of the devices may be mapped onto the corresponding layers using lithography. Additional description of various fabrication steps may be found, e.g., in U.S. Pat. Nos. 6,201,631, 5,629,790, and 5,501,893, the teachings of which are incorporated herein by reference.

While this invention has been described with reference to illustrative embodiments, this description is not intended to be construed in a limiting sense. Various surfaces may be modified, e.g., by metal deposition for enhanced reflectivity and/or electrical conductivity or by ion implantation for enhanced mechanical strength. Differently shaped mirrors, plates, poles, beams, actuators, and/or electrodes may be implemented without departing from the scope and principle of the invention. Springs may have different shapes and sizes, where the term "spring" refers in general to any suitable elastic structure that can recover its original shape after being distorted. Certain embodiments of the invention might employ a flexible membrane instead of a segmented plate. Various MEMS devices of the invention may be arrayed as necessary and/or apparent to a person skilled in the art. An arrayed MEMS device of the invention can be designed for use in an adaptive optics application or a maskless lithography application, or both, or other suitable applications. Various modifications of the described embodiments, as well as other embodiments of the invention, which are apparent to persons skilled in the art to which the invention pertains are deemed to lie within the principle and scope of the invention as expressed in the following claims.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, microsystems, and devices produced using microsystems technology or microsystems integration.

Although the present invention has been described in the context of implementation as MEMS devices, the present invention can in theory be implemented at any scale, including scales larger than micro-scale.

What is claimed is:

1. Apparatus, comprising: a stationary electrode attached to a substrate; and a movable electrode positioned at a first offset distance from the substrate, said stationary and movable electrodes forming a parallel-plate actuator, wherein the movable electrode is (i) connected to a flexible beam attached between two anchors supported on the substrate and (ii) adapted to move in a direction, which is substantially perpendicular to the substrate, wherein, at a rest position, the flexible beam has a curved shape, where the curves of the curved shape are in a single plane parallel to the substrate.

2. The invention of claim 1, further comprising a plate positioned at a second offset distance from the substrate, the plate connected to the flexible beam such that motion of the movable electrode that changes the first offset distance causes motion of the plate that changes the second offset distance.

3. The invention of claim 2, wherein:
the stationary electrode, the movable electrode, the flexible beam, the two anchors, and the plate are parts of a MEMS device; and
the apparatus comprises multiple instances of the device.

4. The invention of claim 3, wherein the devices are arrayed such that the plates of different devices form a substantially contiguous segmented plate.

5. The invention of claim 3, wherein the devices are arrayed such that the movable electrodes of different devices form a substantially contiguous segmented plate.

6. The invention of claim 3, wherein, for at least one device, a footprint of the flexible beam extends outside of a footprint of the plate.

7. The invention of claim 6, wherein:
stationary electrodes of two or more devices form a row of electrodes on the substrate; and
for each of the two or more devices, the two anchors are located at opposite sides of the row at an angle other than 90 degrees.

8. The invention of claim 6, wherein, for at least one device, the movable electrode is adapted to electrically shield a portion of each of one or more flexible beams located between the movable electrode and the plate, said one or more flexible beams belonging to one or more other devices.

9. The invention of claim 1, wherein:
the stationary electrode, the movable electrode, the flexible beam, and the two anchors are parts of a MEMS device; and
the apparatus comprises multiple instances of the device.

10. The invention of claim 9, wherein the devices are arrayed such that the movable electrodes of different devices form a substantially contiguous segmented plate.

11. The invention of claim 9, wherein:
stationary electrodes of two or more devices form a row of electrodes on the substrate; and
for each of the two or more devices, the two anchors are located at opposite sides of the row at an angle other than 90 degrees.

12. The invention of claim 1, wherein: the curved shape is described by a periodic function; and the distance between the two anchors is an integer multiple of a period of the periodic function.

13. The invention of claim 1, wherein the apparatus is a MEMS device.

14. Apparatus, comprising a device having: means for reflecting light, said means for reflecting positioned at an offset distance from a substrate; means for flexibly supporting the means for reflecting on the substrate, wherein: said means for flexibly supporting comprises a flexible beam attached between two anchors supported on the substrate and having, at a rest position, a curved shape, wherein curves of the curved shape are in a single plane parallel to the substrate.

15. The invention of claim 14, wherein:
the curved shape is described by a periodic function; and
the distance between the two anchors is an integer multiple of a period of the periodic function.

* * * * *

UNITED STATES PATENT AND TRADEMARK OFFICE
CERTIFICATE OF CORRECTION

PATENT NO. : 7,206,117 B2 Page 1 of 1
APPLICATION NO. : 11/009447
DATED : April 17, 2007
INVENTOR(S) : Vladimir A. Aksyuk, Cristian A. Bolle and Maria E. Simon It is certified that error appears in the above-identified patent and that said Letters Patent is hereby corrected as shown below:

Please insert the following in column 1, between the Title of the Invention and the line having "BACKGROUND OF THE INVENTION", the following paragraph --The U.S. Government has a paid-up license in this invention and the right in limited circumstances to require the patent owner to license others on reasonable terms as provided for by the terms of contract No. N66001-04-C-8028 awarded by DARPA.--

Signed and Sealed this

Seventh Day of August, 2007

JON W. DUDAS
*Director of the United States Patent and Trademark Office*